United States Patent [19]

Steuer

[11] Patent Number: 5,895,847
[45] Date of Patent: Apr. 20, 1999

[54] APPARATUS FOR GENERATING SIGNAL PULSES

[75] Inventor: Thomas Klaus Steuer, Dachau, Germany

[73] Assignee: KEM Kuppers Elektromechanik GmbH, Karlsfeld, Germany

[21] Appl. No.: 08/948,154

[22] Filed: Oct. 9, 1997

Related U.S. Application Data

[63] Continuation-in-part of application No. 08/634,181, Apr. 18, 1996, abandoned.

[30] Foreign Application Priority Data

May 3, 1995 [DE] Germany ............... 195 16 236

[51] Int. Cl.⁶ ........................................ G01F 3/10
[52] U.S. Cl. ............... 73/261; 73/861.77; 417/418; 418/191
[58] Field of Search ............... 73/253, 261, 861.77, 73/488; 417/415, 416, 417, 418, 419, 420, 405; 418/191, 204, 205, 206.1, 206.2; 137/554

[56] References Cited

U.S. PATENT DOCUMENTS

| | | | |
|---|---|---|---|
| 4,457,074 | 7/1984 | Golder | 33/179.5 R |
| 4,528,471 | 7/1985 | Baumann | 310/11 |
| 4,529,932 | 7/1985 | Doueihi et al. | 324/161 |
| 4,550,508 | 11/1985 | Spaeth | 33/179.5 C |
| 4,641,522 | 2/1987 | LoPresti | 73/261 |
| 4,685,051 | 8/1987 | Hattori et al. | 364/424.1 |
| 4,805,465 | 2/1989 | Gerrath et al. | 73/862.34 |
| 4,815,318 | 3/1989 | LoPresti | 73/261 |
| 4,972,232 | 11/1990 | Luebbering et al. | 364/565 |
| 5,184,519 | 2/1993 | Ciarelli et al. | 73/861.77 |
| 5,251,600 | 10/1993 | Britsch et al. | 123/414 |
| 5,275,043 | 1/1994 | Cotton | 73/261 |
| 5,300,918 | 4/1994 | Becker | 338/196 |
| 5,311,029 | 5/1994 | Beatrice | 250/551 |
| 5,415,041 | 5/1995 | Foran, Jr. et al. | 73/261 |
| 5,553,493 | 9/1996 | Box et al. | 73/261 |

FOREIGN PATENT DOCUMENTS

G 94 210
5728  6/1995  Germany.

Primary Examiner—Hezron Williams
Assistant Examiner—Richard A. Moller
Attorney, Agent, or Firm—Tilton, Fallon, Lungmus & Chestnut

[57] ABSTRACT

The invention relates to an apparatus for generating signal pulses with a gear arrangement, which has at least two meshing gears and with a sensor means for detecting a gear rotation and for emitting signal pulses as a function on the detected gear rotation. According to the invention a sensor of the sensor means is located in the vicinity of the gear arrangement at a point where the sensor detects the rotation of both gears.

12 Claims, 5 Drawing Sheets

Signal

Signal

APPARATUS FOR GENERATING SIGNAL PULSES

This application is a continuation in part application of application Ser. No. 08/634,181, filed Apr. 18, 1996, abandoned.

FIELD OF THE INVENTION

The invention relates to an apparatus for generating signal pulses comprising a gear arrangement having at least two meshing gears, a sensor means having a sensor for detecting a rotation of said meshing gears, said sensor means emitting signal pulses as a function of the detected rotation of said meshing gears.

DESCRIPTION OF THE PRIOR ARTS

Such signal pulse generating apparatuses are used for measuring various physical quantities, e.g. volume, speed, acceleration, etc. In the case of the known apparatuses the gear pair is e.g. rotated by a flow or a drive shaft. A sensor detects the movement of the teeth and in each case emits a signal pulse when a tooth moves past. The number of pulses per time unit ie a measure of the speed or rotational speed of the gear. The pulses can also be used for regulating and control purposes.

One field of application of such apparatuses is in volumetric meters. Such a volumetric meter is e.g. known from German utility model G 94 20 572.8. In such geared flowmeters a sensor is located in the circumferential area of one of the gears. The flow through the gear arrangement and which drives the latter is determined on the basis of the pulses emitted by the sensor for each tooth moving past.

In certain application cases the number of emitted signal pulses per gear rotation is too low for the control, regulating and measuring processes. For doubling the number of signal pulses it is known to position a second sensor at the other gear of the gear pairs. Through an electronic combination of the output signals of the two sensors a signal doubling can be achieved. Although the use of a second sensor is satisfactory for many applications, an additional sensor and additional components for the electronic signal combination are required.

SUMMARY OF THE INVENTION

The object of the invention is to so further develop in a particularly economic manner an apparatus for generating signal pulses that it can emit the maximum number of signal pulses per time unit. According to the invention this object is achieved in an apparatus for generating signal pulses comprising a gear arrangement having two metallic meshing gears, said metallic meshing gears each having a shaft and said metallic meshing gears describing two addendum circles forming at least an intersection, and a sensor means for detecting a rotation of said meshing gears and emitting signal pulses as a function of the detected rotation of said meshing gears, said sensor means having a carrier frequency sensor, wherein said carrier frequency sensor is positioned in a axial direction of said meshing gears in displaced manner thereto alongside said intersection of said two addendum circles and equidistantly with respect to said shafts of said meshing gears at a point where said carrier freqency sensor is detecting the rotation of both metallic meshing gears.

In an advantageous embodiment of the invention said carrier frequency sensor comprises an oscillating circuit having an inductivitiy and a capacity, said inductivity generating an electric field which is attenuated when a single tooth of one of said metallic meshing gears is moved along said carrier frequency sensor. It is particularly advantageous that said carrier frequency sensor comprises a Colpitts oscillator. Preferably, said gear arrangement has two ferromagnetic meshing gears. However, it is also possible that the meshing gears are made of a metallic, non-magnetic material.

According to another aspect of the invention this object is achieved in an apparatus for generating signal pulses comprising a gear arrangement having at least two meshing gears, a sensor means having a sensor for detecting a rotation of said meshing gears, said sensor means emitting siggnal pulses as a function of the detected rotation of said meshing gears, in that said sensor of said sensor means is located in the vicinity of said gear arrangement at a point where said sensor is detecting the rotation of the at least two meshing gears.

The idea of the invention is to so position a single sensor in the vicinity of the two gears, that both gears are zonally located in the detection range of the sensor. In particular, the sensor alternately detects the teeth of both gears. During rotation and the meshing of the two gears, for example one tooth of one gear and then one tooth of the other gear is detected. A pulse is emitted whenever the sensor detects a tooth. With such a sensor positioning twice as many signal pulses compared with known sensor means with one sensor are generated. This signal doubling is achieved without an additional sensor and without a special signal combination device.

An advantageous embodiment of the invention comprises the positioning of the sensor close to the circumferential area of the gears and the sensor emits a signal pulse on detecting a tooth moving past. The sensor can be positioned both in the front area of the gears or in the edge area thereof. The detection range of the sensor is such that only in each case one tooth of the two gears is in the detection sector at a given time, so that a discrete signal pulse is generated. After the tooth has left the detection sector, a tooth of the other gear passes through the sensor detection sector and generates a further discrete signal.

According to the invention it is advantageous that the sensor in the axial direction of the gears is displaced with respect thereto alongside the engagement zone of the gears. The engagement zone of the gears is in this case the overlap area of the addendum circles of the two gears. As a result of the axial displacement there is sufficient space to position the sensor frontally with respect to the gears.

It is particularly advantageous that the sensor is located in the vicinity of the intersection of the addendum circles of the gears. The intersection of the addendum circles is the point in the engagement zone where there is a maximum spacing between two successive teeth. Therefore this position is particularly suitable for generating discrete signal pulses.

According to the invention the sensor is equidistant with respect to the axes of the gears. As a result of this symmetrical arrangement of the sensor, it is ensured that the signal pulses generated always have a constant mutual spacing.

According to the invention, in an advantageous embodiment, the sensor operates in contactless manner. Thus, the sensor avoids additional mechanical wear on the gears. The sensor can be an electronic or optical sensor. The sensor preferably operates according to a magnetic-inductive detection principle. Such a sensor can e.g. detect a single ferromagnetic material tooth. However, on the individual teeth of the gears can also be provided marking elements, e.g. magnetic points or dots, which trigger the signal pulse on passing through the detection sector of the sensor However, it is particularly advantageous for the sensor to be a carrier frequency, Hall or inductive sensor. Such sensors represent reliable standard sensors, which allow a compact arrangement in an apparatus according to the invention.

In another embodiment of the invention, it is advantageous for the sensor to be located at a point where the signals generated by detecting the rotary movement of one gear have a specific phase shift with respect to the signals generated by the detection of the other gear. The phase shift can be chosen in such a way that the individual signal pulses have the same or different, mutual pulse intervals. Non-uniform signal intervals, which are advantageous for certain regulating or control processes, can e.g. be generated by an asymmetrical arrangement of the sensor with respect to the gear axes or by applying marking elements at different points of the teeth of the gears.

According to an advantageous further development of the invention by modifying the position and/or orientation of the sensor a desired phase shift can be set. This is e.g. possible by a setting device through which the position and/or orientation of the sensor with respect to the gear pair can be modified. Thus, as a function of the particular application, a desired phase shift can be set.

According to an advantageous further development of the invention the sensor means has several sensors. By a corresponding increase in the number of sensors, there can be a optional multiplication of the number of pulses. Thus, a tripling can be achieved in that a conventionally timed sensor is combined, with a "double detections" sensor. A quadrupling can be achieved with only two sensors in that on the gear pair are positioned two sensors, which in each case detect the rotation of both gears.

Another advantageous further development comprises the sensor means having a signal processing electronics. The signal processing electronics serves to combine the output signals of different sensors. In particular, said electronics can perform an EXOR (exclusive-or) combination of several signals, in order to obtain a common output signal of the sensor means.

BRIEF DESCRIPTION OF THE DRAWINGS

The invention is described in greater detail hereinafter relative to embodiments and the attached drawings, wherein show:

FIGS. 1b and 1c Signal diagrams of the apparatus according to FIG. 1a

FIGS. 2b and 2c Signal diagrams for the apparatus according to FIG. 2a.

DETAILED DESCRIPTION RELATIVE TO THE DRAWINGS

Figure 1A:
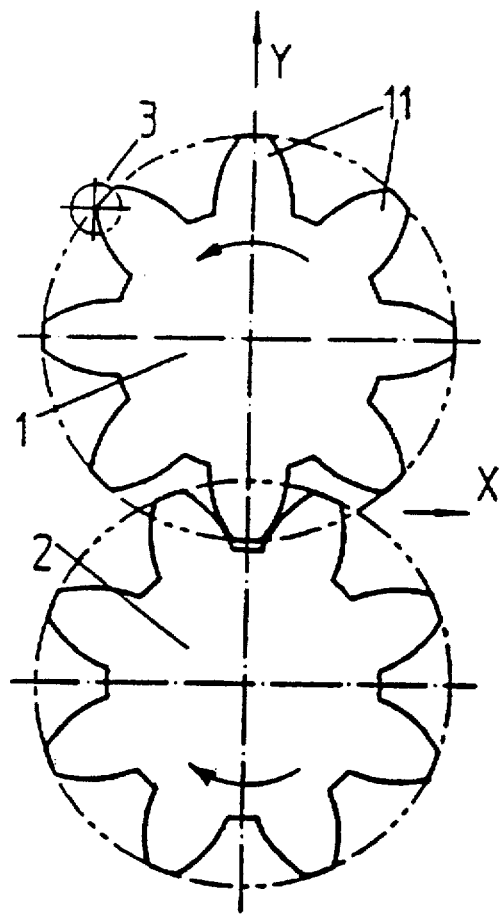
FIG. 1a In highly diagrammatic manner a conventional apparatus with a sensor.

FIG. 1a shows the fundamental arrangement of a sensor 3 in a conventional signal pulse generating apparatus. The sensor 3 is located in the vicinity of the outer circumference of a gear 1, which meshes with a gear 2. The sensor 3 in each case emits a signal pulse on the moving past of the teeth 11 of tho gear 1.

Figure 1B:
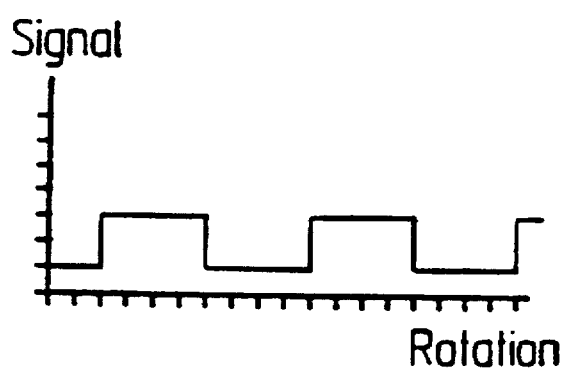

FIG. 1b is a signal diagram showing the signal pattern generated by the sensor 3 according to FIG. 1a. The signal diagram shows that when a tooth 11 passes through the detection sector of the sensor 3 there is in each case a signal level change.

Figure 1C:
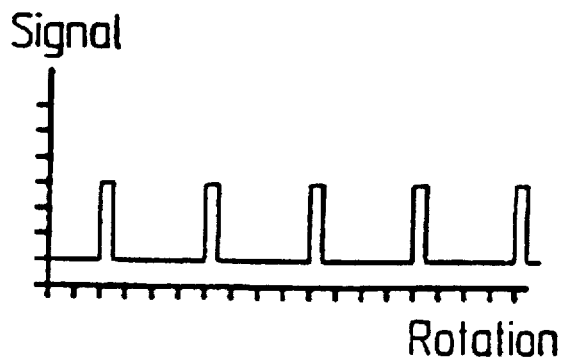

FIG. 1c is a further signal diagram showing the signal pulse pattern of the sensor 3 of FIG. 1a. When a tooth 11 moves past the sensor 3 in each case a single signal pulse is generated.

Figure 2A:
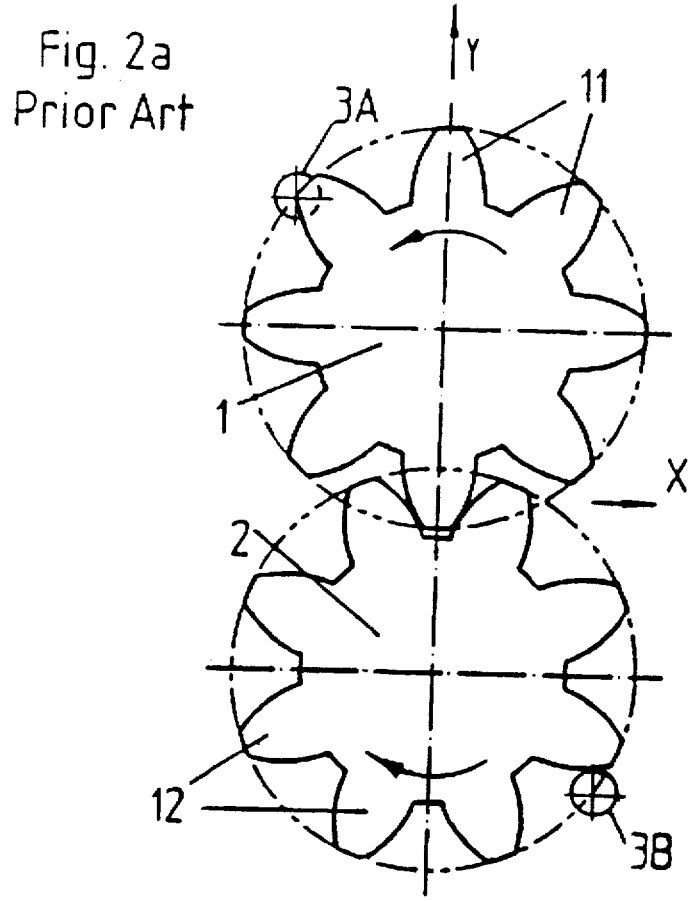
FIG. 2a In highly diagrammatic manner a conventional apparatus with two sensors.

FIG. 2a shows the fundamental arrangement of a conventional signal generator with which it is possible to achieve a pulse doubling compared with the generator of FIG. 1a. The apparatus has two meshing gears 1 and 2. In the immediate vicinity of the circumferential area of the gear 1 is located a sensor 3A, which detects the moving past of the teeth 11 of the gear 1. A second sensor 3B is located on the circumferential area of the gear 2, in order to detect the moving past of its teeth 12.

Figure 2B:
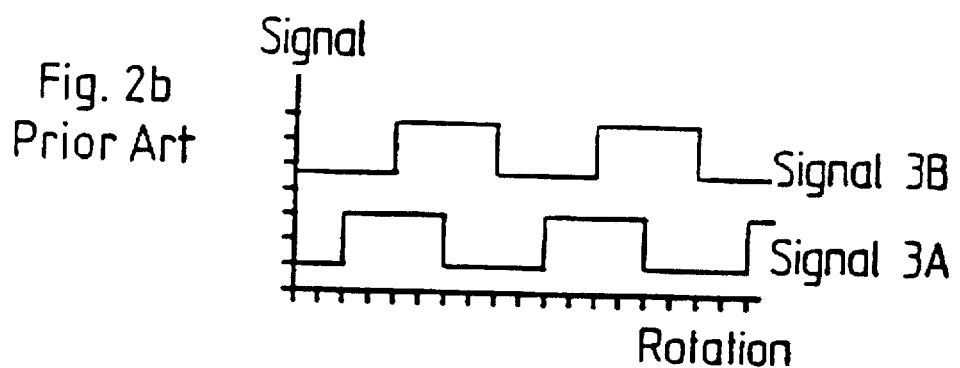
Figure 2C:
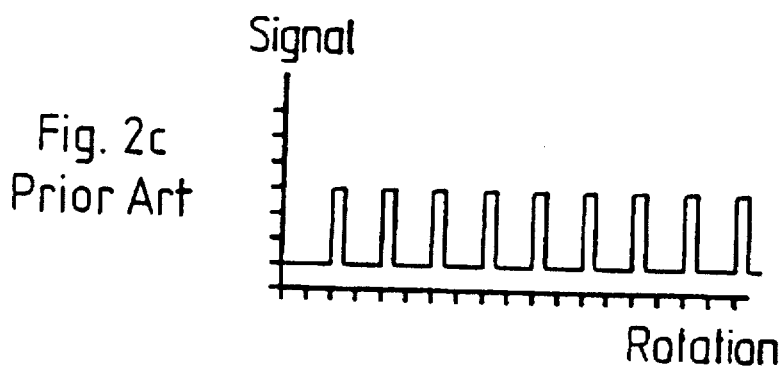

The signal diagram according to FIG. 2b shows separately the two signal patterns of the sensors 3A and 3B. It can be gathered from the two signal patterns that the two sensors are in each case so positioned with respect to the gears 1 and 2, that the signal patterns are mutually desplaced by half a phase. Through a suitable electronic combination it is possible to produce from these two signal patterns a common output pulse signal shown in FIG. 2c. With a suitable signal combination the signal pulses are equidistantly spaced.

DESCRIPTION OF A PREFERRED EMBODIMENT

Figure 3A:
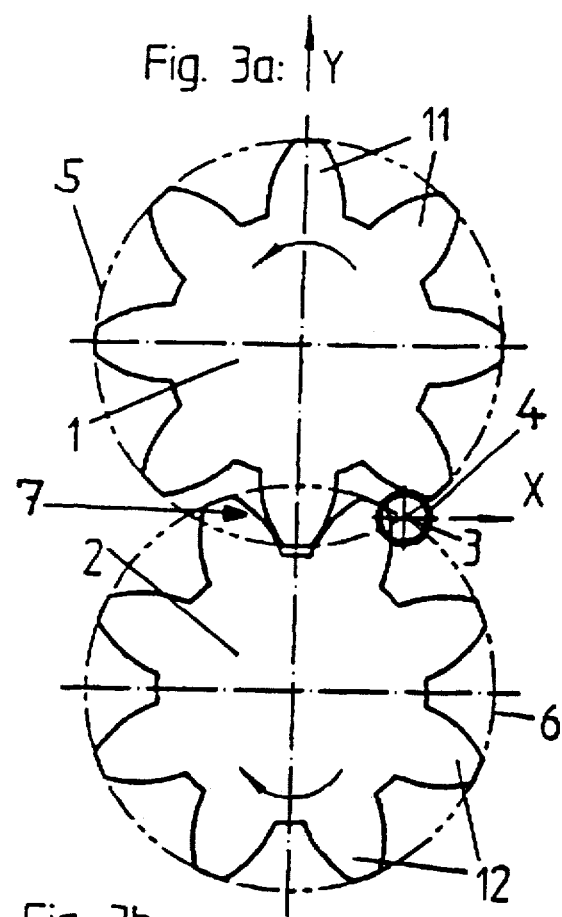
FIG. 3a In highly diagrammatic manner an apparatus according to the invention with one sensor.

An apparatus according to the invention is diagrammatically shown in FIG. 3a and has two meshing gears 1 and 2. The addendum circles 5 and 6 of the two gears 1 and 2 surround in their overap area the engagement zone 7. A sensor 3 is located at the right-hand intersection 4 of the two addendum circles 5, 6. Through the detection area of the sensor 3 pass alternately the teeth 11 of the gear 1 and the teeth 12 of the gear 2.

Figure 3B:
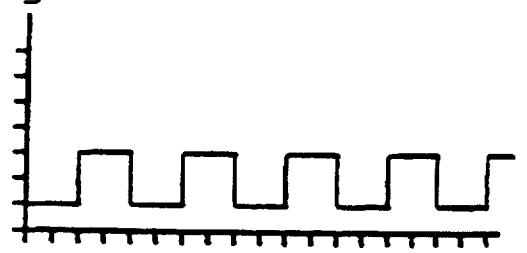
FIG. 3b Signal diagrams for the apparatus of FIGS. 3a and 3c.

FIG. 3b shows the signal pattern produced by the apparatus according to the invention shown in FIG. 3a. FIG. 3b makes it clear that with a comparable gear arrangement and for the same speed in the case of the apparatus according to the invention there is a doubling of the signal frequency compared with the conventional apparatuses of FIGS. 1a and 2a.

Figure 3C:
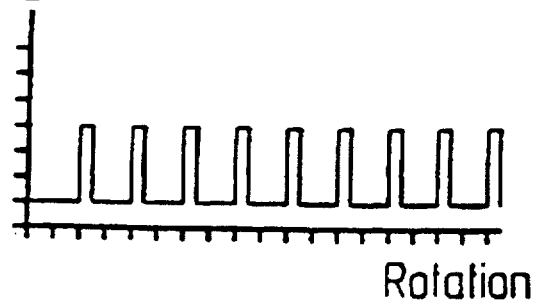

The signal pulse pattern of FIG. 3c makes it clear that with the apparatus according to the invention the same number of signal pulses as with the conventional apparatus of FIG. 2a is obtained. However, this result is achieved with the apparatus according to the invention with a single sensor and without complicated signal combination electronics.

Figure 4:
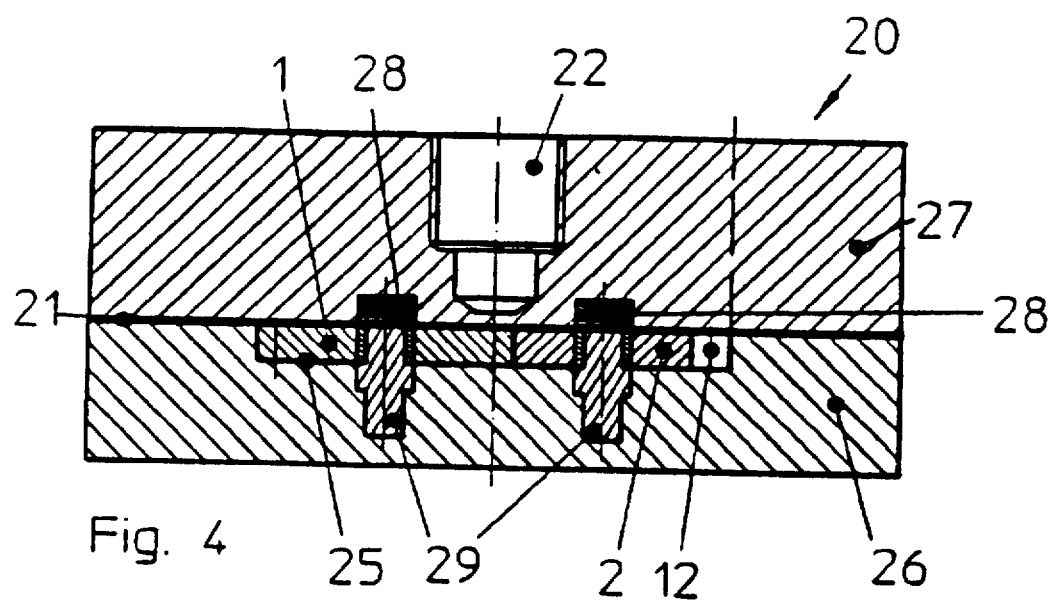
FIG. 4 A cross-sectional view through an embodiment of the invention.

FIG. 4 shows in diagrammatic manner the apparatus according to the invention in the case of a volumetric meter 20. FIG. 4 shows a section through the volumetric meter in the plane of the gear axes or shafts 29. The volumetric meter 20 is constructed in the manner of a geared motor and has two casing halves 26, 27, which are indicated as a cover and base and are sealed by a gasket 21. The casing halves 26, 27 surround a measuring chamber 25 in which are located the gears 1 and 2. In the lower casing half 26 are fixed the shafts 29 on which in each case is mounted in rotary manner a gear 1 and 2. The running up of the gears 1 and 2 onto the upper measuring chamber is prevented by base plates 28, which are integrated in the upper casing half 27.

In the upper casing half 27 and equidistantly with respect to the shafts 29 is provided a blind hole 22 with tapped thread, which serves as a sensor receptacle. Through the blind hole 22, which extends to the immediate frontal area of the gears 1 and 2, a sensor can be fitted outside the measuring chamber 25 for the contact-free detection of the gear rotation in the frontal area of the gears 1 and 2. The blind hole 22 is positioned centrally to the shafts 29 above the engagement zone, which is traversed both by the teeth 11 of the gear 1 and teeth 12 of the gear 2. Thus, the not shown sensor in the blind hole 22 can alternately detect the moving past teeth 11 and 12 of the two gears 1 and 2.

Figure 5:
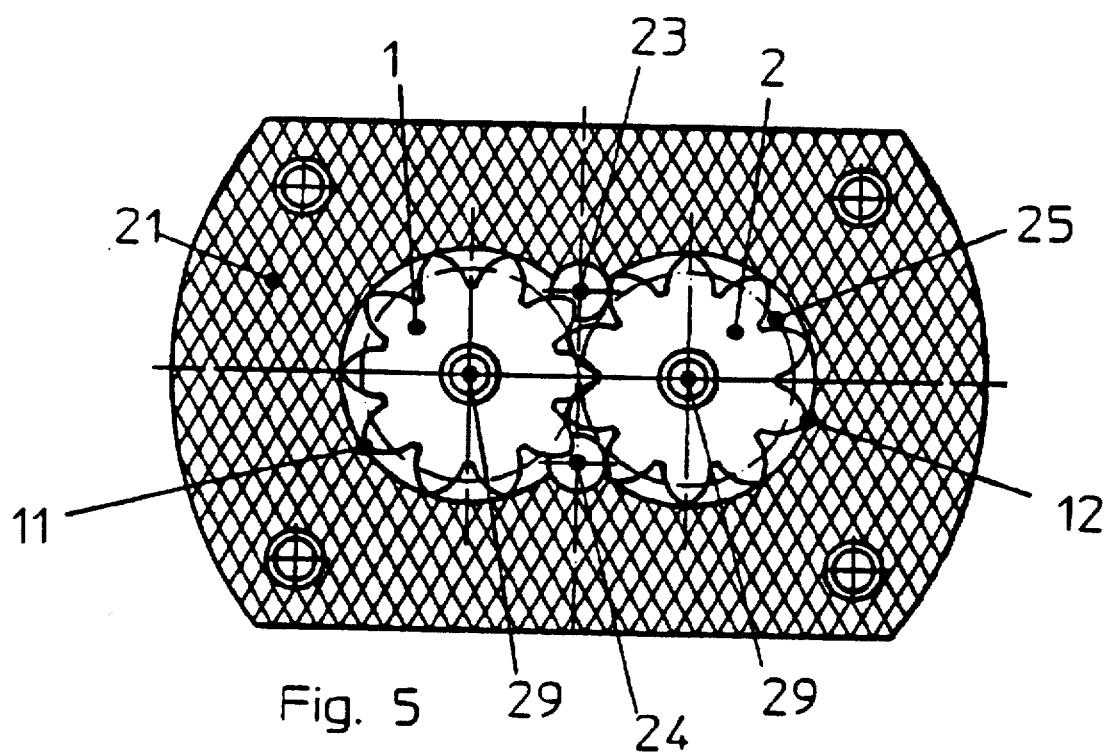
FIG. 5 A plan view of the lower part of the apparatus of FIG. 4.

FIG. 5 is a plan view of the lower casing part 26 with the gasket 21. In the lower casing half 26 are located in accurately fitting manner in the measuring chamber 25 the two gears 1 and 2. For measuring a through-flow an inlet channel 23 and an outlet channel 24 are located in the lower casing half 26. The flow from the inlet channel 23 to the outlet channel 24 starts up the rotation of the two gears 1 and 2. The teeth 11 and 12 alternately passing the sensor give rise to a corresponding number of signal pulses, which can be processed in an evaluating electronics for the determination of the through-flow.

Figure 6:
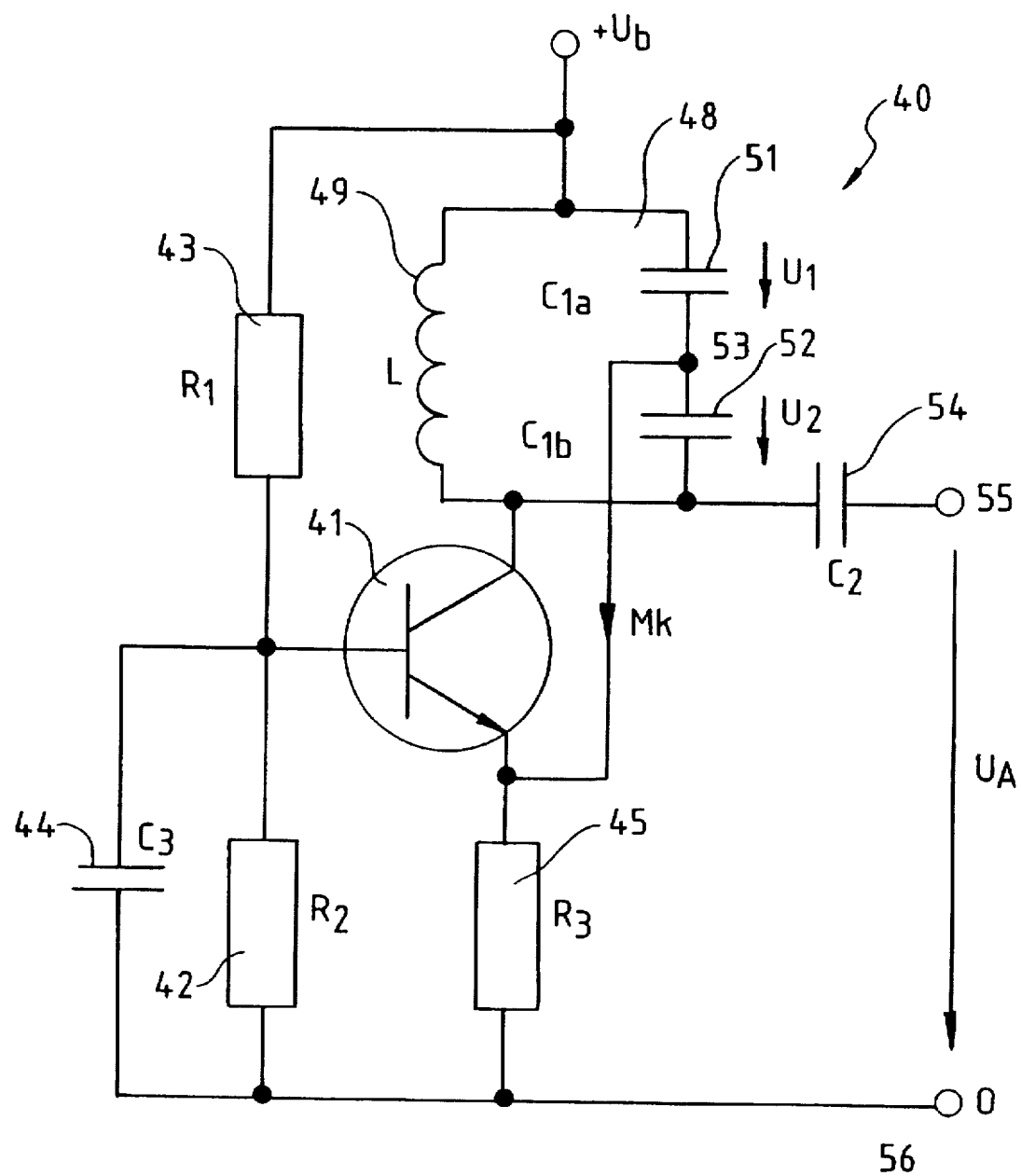
FIG. 6 A schematic circuit diagram of an oscillator according to a preferred embodiment.

FIG. 6 shows the structure of a carrier frequency sensor in the form of an oscillator according to a preferred embodiment. The oscillator 10, which can be in particular designed as a Colpitts oscillator, has a npn transistor 41. Across a voltage divider of resistors 42, 43 on the one hand, the base of the transistor 41 is at the supply voltage $+U_b$ and on the other at O-potential at the output terminal 43. A capacitor 44 is connected in parallel to the resistor 42. Obviously other equivalent circuits are possible, in which use is e.g. made of a pnp transistor.

Across a resistor 45, the emitter of the transistor 41 is also at O-potential. A parallel resonant circuit 48 is connected between the supply voltage $+U_b$ and the collector of the transistor 41. On the one hand the resonant circuit 48 has an inductance coil 49 or a coil, which is parallel to two series-connected capacitors 51, 52. Between the series-connected capacitors 51, 52 is provided a centre tap 53, which passes to the emitter. Thus, on the one hand the capacitor is at the centre tap 53 and with the other connection at the collector of the transistor 41, as well as at a connection of a further capacitor 54, whose other pole forms the connection 55 for the output voltage $U_A$.

The sensor element of the resonant circuit 48 is formed by the coil 49. If a metal tooth is led past the vicinity of the coil 49, the electric field produced by the coil is damped. As a result of this damping the quality of the coil and therefore the quality of the resonant circuit changes. This resonant circuit quality change modifies the frequency and amplitude of the carrier frequency signal which can be tapped between the connections 56 and 55. Through the further evaluation of the carrier frequency signal and in particular the envelope of the carrier frequency signal, it is possible to very precisely determine the gear speed and consequently the volume of a fluid flowing through the measuring device. Using the apparatus according to the invention it is fundamentally possible to determine, apart from the speed, also the rotation direction and at least a rotation direction change of the gear. In the case of a rotation direction change the path of a tooth through the electric field produced by the coil 49 changes and in particular an entry angle into and exit angle out of the field. This leads to a modified damping of the field, which can be detected by the frequency and/or amplitude of the tappable carrier frequency signal. An evaluating device can establish the carrier frequency signal change brought about by the rotation direction change, so that information on the rotation direction can be obtained, in addition to the speed.

Particularly with an asymmetrical arrangement of the carrier frequency sensor with respect to the two gears, a rotation direction change can be detected.

The gears are worked from a metallic material, which can be a magnetic or a non-magnetic material. The material of the gears can be freely chosen on-the basis of the criteria of chemical stability, hardness, wear resistance, etc.

However, the apparatus according to the invention can not only be used on volumetric meters of gear pumps, but also in all other measuring, controlling and regulating arrangements, in which signal pulses generated by gear rotation are used. For example, the apparatus according to the invention can be used for speed measurement on machines or for speed, distance and acceleration measurement, more particularly in vehicles.

I claim:

1. Apparatus for generating signal pulses comprising:
    a gear arrangement having two metallic meshing gears, said metallic meshing gears each having a shaft and said metallic meshing gears describing two addendum circles forming at least an intersection; and a sensor means for detecting a rotation of said meshing gears and emitting signal pulses as a function of the detected rotation of said meshing gears, said sensor means having a carrier frequency sensor, wherein said carrier frequency sensor is positioned in an axial direction of said meshing gears in displaced manner thereto alongside said intersection of said two addendum circles and equidistantly with respect to said shafts of said meshing gears at a point where said carrier frequency sensor is detecting the rotation of both metallic meshing gears.

2. Apparatus according to claim 1, wherein said carrier frequency sensor comprising an oscillating circuit having an inductivity and a capacity, said inductivity generating an electrical field, which is attenuated when a single tooth of one of said metallic meshing gears is moved along said carrier frequency sensor.

3. Apparatus according to claim 1, wherein said carrier frequency sensor comprises a Colpitts-oscillator.

4. Apparatus according to claim 1, wherein said gear arrangement having two ferromagnetic meshing gears.

5. Apparatus according to claim 1, wherein said meshing gears having teeth and a circumferential area, and said carrier frequency sensor emits a signal pulse on detecting a tooth moving past.

6. Apparatus according to claim 1, wherein said carrier frequency sensor operates in contactless manner.

7. Apparatus according to claim 1, wherein said sensor means is a Hall sensor.

8. Apparatus according to claim 1, wherein said sensor means is an inductive sensor.

9. Apparatus according to claim 1, wherein said carrier frequency sensor is located at a point at which the signal pulses generated by the detection of the rotation of a gear have a specific phase shift with respect to the signal pulses generated by the detection of the rotation of the other gear.

10. Apparatus according to claim 9, wherein a desired phase shift can be set by modifying a position of said carrier frequency sensor.

11. Apparatus according to claim 9, wherein a desired phase shift can be set by modifying an orientation of said carrier frequency sensor.

12. Apparatus according to claim 1, wherein said sensor means comprises several sensors.

* * * * *